(12) United States Patent
Kirby et al.

(10) Patent No.: US 10,891,420 B1
(45) Date of Patent: Jan. 12, 2021

(54) CUSTOMIZATION ENGINE FOR THE AUTO-GENERATION OF READABLE MARKUP

(71) Applicant: TurboPatent Inc., Seattle, WA (US)

(72) Inventors: Chad Kirby, Seattle, WA (US); Benjamin Demboski, Seattle, WA (US); Daniel Shank, Seattle, WA (US); Mark Charyk, Seattle, WA (US)

(73) Assignee: Rowan TELS Corp., Seattle, WA (US)

( * ) Notice: Subject to any disclaimer, the term of this patent is extended or adjusted under 35 U.S.C. 154(b) by 346 days.

(21) Appl. No.: 15/688,807

(22) Filed: Aug. 28, 2017

Related U.S. Application Data

(60) Provisional application No. 62/379,923, filed on Aug. 26, 2016.

(51) Int. Cl.
*G06F 40/117* (2020.01)
*G06F 40/106* (2020.01)
*G06F 40/109* (2020.01)
*G06F 40/114* (2020.01)
*G06F 40/111* (2020.01)

(52) U.S. Cl.
CPC .......... *G06F 40/117* (2020.01); *G06F 40/106* (2020.01); *G06F 40/109* (2020.01); *G06F 40/111* (2020.01); *G06F 40/114* (2020.01)

(58) Field of Classification Search
CPC ..................................... G06F 17/218
USPC ............................................. 715/234
See application file for complete search history.

(56) References Cited

U.S. PATENT DOCUMENTS

| 10,095,692 B2 * | 10/2018 | Song ................... G06F 40/56 |
| 2010/0100515 A1 * | 4/2010 | Bangalore ........... G06F 17/248 706/46 |
| 2013/0204891 A1 | 8/2013 | Maw |
| 2015/0012528 A1 * | 1/2015 | Kapadia ............... G06F 40/169 707/722 |
| 2016/0188981 A1 * | 6/2016 | Doerring ............ G06F 16/7834 382/190 |
| 2017/0075877 A1 * | 3/2017 | Lepeltier .............. G06F 40/205 |

* cited by examiner

*Primary Examiner* — Ariel Mercado
(74) *Attorney, Agent, or Firm* — Rowan TELS LLC

(57) ABSTRACT

A system and method for controlling the display of markup on a textual interface measures the difference between edited and unedited text, and utilizes values for hidden-copy tokens to create an incremental scale of values to generate different complexity levels of marked-up text to display on a user interface.

11 Claims, 4 Drawing Sheets

CUSTOMIZATION ENGINE FOR THE AUTO-GENERATION OF READABLE MARKUP

BACKGROUND

Drafters and editors have different styles of markup that they like to see when showing changes to a text document. Some prefer a more technically accurate minimal set of changes in order to focus attention on just the words that have been actually changed, while others prefer a more readable set of markup where larger pieces of text are added and removed so that the reader can more easily read and understand what the final text is. Currently, users would have to specify individual changes that are being made and mark up those changes manually, instead of writing naturally. Similarly, a reviewer might have different preferences for how the markup is displayed for to best allow them to proofread the text, in this instance, the reviewer would have to either take the marked-up text as-is or rewrite it manually, which would likely introduce additional errors and be incredibly time intensive.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
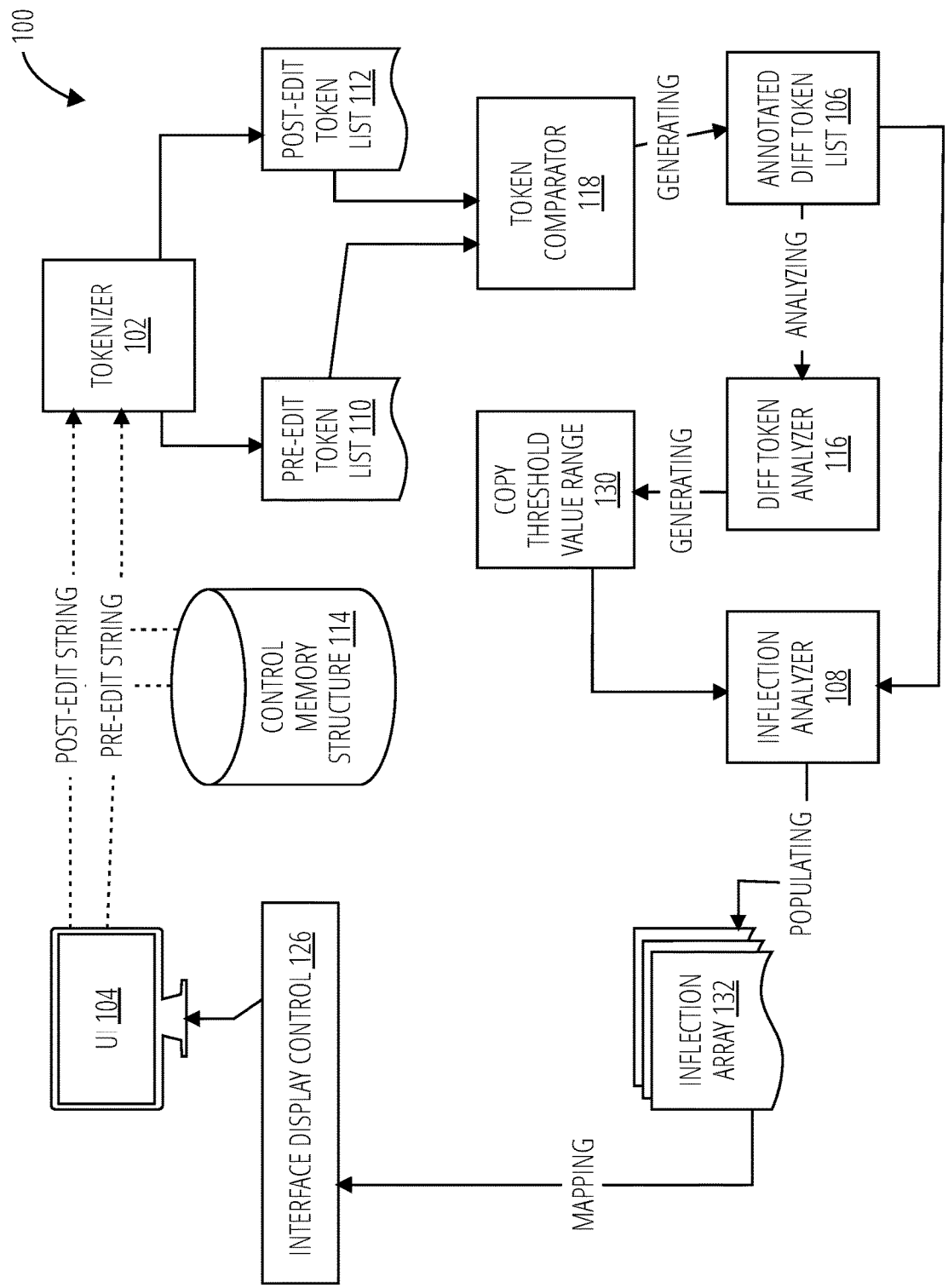
FIG. 1 illustrates an embodiment of a system for the auto-generation of readable markup 100.

"Levenshtein distance" in this context refers to a string metric for measuring the difference between two sequences. Informally, the Levenshtein distance between two words is the minimum number of single-character edits (i.e. insertions, deletions or substitutions) required to change one word into the other.

"Complexity" in this context refers to meaning the number of non-contiguous edits presented to the end user. For example the text "A widget knobs" is more complex than "A widget with knobs."

"Diff" in this context refers to the output of a data comparison tool that calculates and displays the differences between two files.

"Edit token" in this context refers to a token or group of text which indicates an insertion, deletion, substitution, or other edit performed on the text contained within it.

"hidden-copy token" in this context refers to a token or group of text adjacent to a larger edit token.

"Inflection array" in this context refers to a collection of inflection values. This collection may be an array, or a different type of data collection such as a list.

"Inflection analyzer" in this context refers to logic to take a normalized string, delineating the type and number of edits needed to change clean text into edited text, and count the type and number of edits and populate those values in a collection such as an array.

"Inflection value" in this context refers to the number of characters in a token or group of characters which will cause a change in the display of readable markup, if applied.

"String metric" in this context refers to a metric for measuring the difference between two strings of characters.

The system and method helps users generate markup to show edits which have been made in a text document. The edited text includes markup language that communicates what characters should be changed in order to produce the resultant text. This markup may currently be manually added by a writer or proof-reader either through the modification of formatting for a set of words or through the use of a track-changes feature in a word-processing application.

The system may allow the user to specify an unedited set of text and an edited set of text and then based on changes to that text, automatically generate a set of final text that includes markup depicting the changes made by the user. This final edited text along with the auto-generated markup may then be exported for use by the user.

The auto-generated markup is created by creating and analyzing a "diff" between two different sets of text and creating a word-by-word set of text that delineates whether a set of characters has been added or deleted. The diff may comprise a token list and may be generated using techniques and libraries well known in the art. Different methods may be used to delineate these actions based on the size of the character string being deleted. A post-processing step may be taken in order to correct some of the markup according to common practices regarding punctuation.

The user may be given a means of customizing the generation of the markup themselves utilizing an interface display control, for example, a slider. This slider may change a value that corresponds to the number of characters within a "hidden-copy token" that can exist between markup sets (e.g. edit tokens) before the characters are struck out and re-added. This is to give the user some amount of customization over the style of the markup as sometimes the drafter or reviewer may want a larger amount of the markup to be added or removed.

For a given set of changes to a string of characters, there may be multiple different ways of representing those changes without changing the resulting text. For instance, the replacement of a word could be shown as a deletion of the first clause, followed by an insertion of a second clause, or by a word-by-word replacement of the first clause by the second clause. Depending on the edits made adjacent to the word, the user may have a preference for the manner in which the markup is displayed. The user may prefer that the resulting text be displayed with less "complex" markup, meaning the number of noncontiguous edits presented to the end user is decreased.

The user may have a preference for markup to display as one continuous line of deleted text followed by the input of the insertion of a contiguous line of text which include the inserted word, rather than showing the replaced word as disrupting the string of deleted text. For example, markup to transform the string "a bed" into the string "obtaining a red bed", with a copy threshold of "0" may output the diff token list "<insert>obtaining</insert> a <insert>red</insert>bed". However, the hidden-copy token "a" would be easy to overlook when a human reads the markup because it is surrounded by long insert-text groups. By adjusting the copy threshold to "1", more readable markup (that is less likely to be misinterpreted by a human) is obtained, because the 1-char hidden-copy token "a" will be disallowed: "<delete>a</delete><insert>obtaining a red</insert>bed". Adjusting the copy threshold to "3", the 3-char hidden-copy token "bed" will also be disallowed: "<delete>a bed</delete><insert>obtaining a red bed</insert>".

Complexity of markup may be controlled in a number of ways, for example, by varying the lengths of insert/delete tokens, or a ratio of adjacent token groups of different types. By varying the single parameter of the minimum length of copy-text groups that appear between edit text groups, a single parameter may be varied to dynamically control the display of markup and create complex variations in the output. A smaller minimum text length equates to greater complexity and a longer minimum text length equates to less complexity. This approach presents a problem in practice, because the output complexity may vary nonlinearly and discontinuously, so an incremental change in the input does not necessarily represent an incremental change in the output. For example, a minimum copy threshold value of 4 or 7 may produce no markup, while a hidden copy threshold value of 5, 6, or 8 may produce a large difference. This makes the establishment of a user control difficult unless the inputs and outputs are normalized to more closely represent a linear relationship between a user control and the complexity of markup displayed, so a user may more intuitively control the display of markup complexity. To normalize the user control input and output, the text may be analyzed to determine inflection values. Determining the inflection value (the values at which the markup changes) for the simplification of the markup may be achieved by examining the text for the length and type of edits being made, then determining whether a text group may be absorbed by an adjacent text group of a different type. Inflection values may be added to an inflection array. The elements of the inflection array may be mapped to discrete values on a scale representing the "complexity" of the markup which may be depicted on a user interface, for example, utilizing a slider.

The system for the auto-generation of readable markup 100 comprises a tokenizer 102, a User-Interface (UI) 104, an annotated diff token list 106, an inflection analyzer 108, a pre-edit token list 110, a post-edit token list 112, a control memory structure 114, a diff token analyzer 116, a token comparator 118, an interface display control 126, a copy threshold value range 130, and an inflection array 132.

The tokenizer 102, receives a post-edit string and a pre-edit string from a UI 104 or a control memory structure 114. The tokenizer 102 tokenizes the pre-edit string and the post-edit string into a pre-edit token list 110 and a post-edit token list 112. The token comparator 118 compares the pre-edit token list 110 to the post-edit token list 112 to generate an annotated diff token list 106. The diff token analyzer 116 analyzes the annotated diff token list 106 and generates a copy threshold value range 130. The annotated diff token list 106 and the copy threshold value range 130 are applied to the inflection analyzer 108 and the inflection analyzer 108 populates an inflection array 132. The inflection array 132 is mapped to an interface display control 126 to control the display of readable markup on the UI 104.

Figure 2:
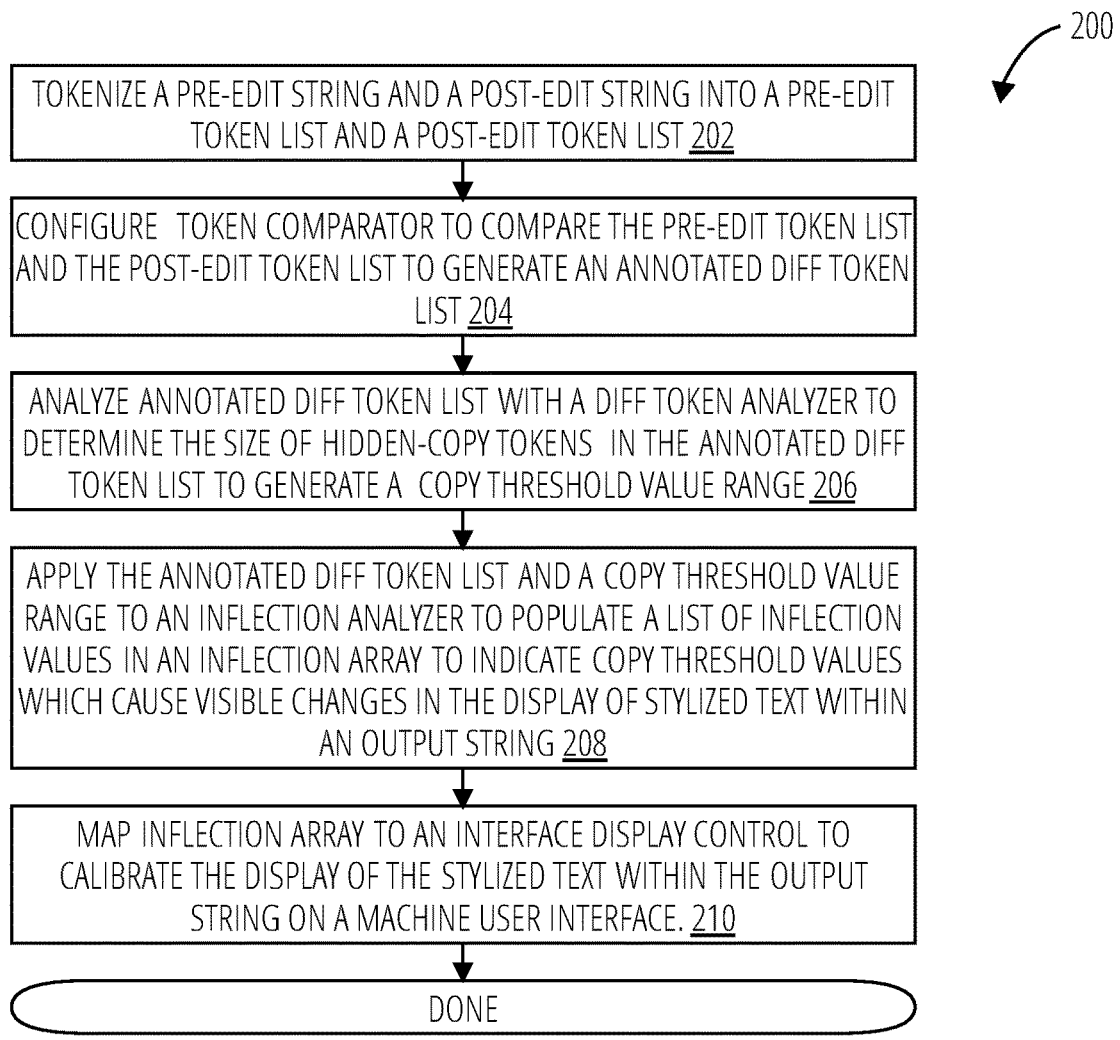
FIG. 2 illustrates an embodiment of a process for the auto-generation of markup 200.
Figure 3:
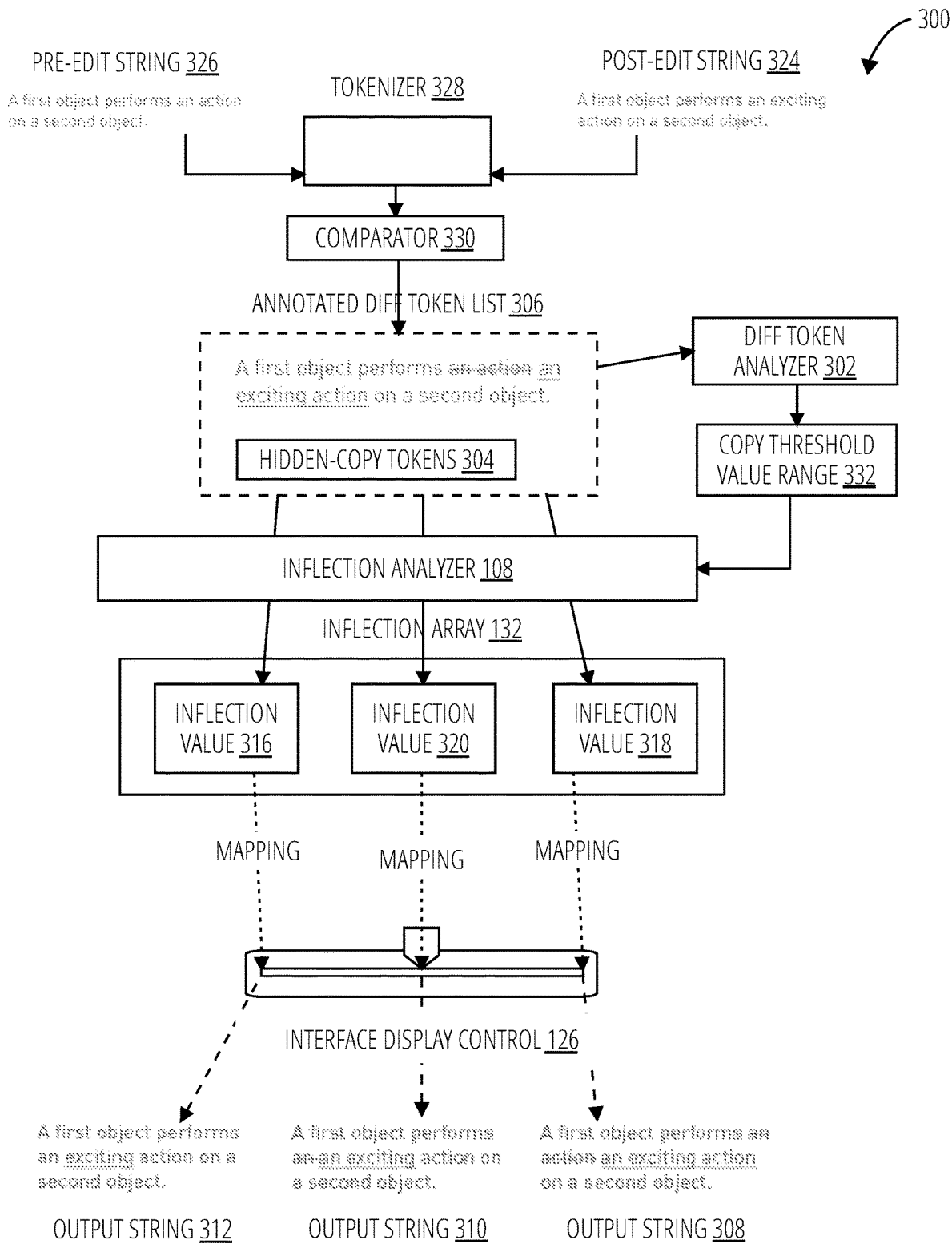
FIG. 3 illustrates an aspect of a system for the auto-generation of readable markup 300 in accordance with one embodiment.

The system for the auto-generation of readable markup 100 may be operated in accordance with the process described in FIG. 2.

Referring to FIG. 2, the process for the auto-generation of markup 200 tokenizes a pre-edit string and a post-edit string into a pre-edit token list and a post-edit token list (block 202).

Configures a token comparator to compare the pre-edit token list and the post-edit token list to generate an annotated diff token list (block 204). Analyzes the annotated diff token list with a diff token analyzer to determine the size of hidden-copy tokens in the annotated diff token list to generate a copy threshold value range(block 206). Applies the annotated diff token list and a copy threshold value range to an inflection analyzer to populate a list of inflection values in an inflection array to indicate copy threshold values which cause visible changes in the display of stylized text within an output string (block 208). Map the inflection array to an interface display control to calibrate the display of the stylized text within the output string on a machine user interface.(block 210)

A method for dynamically controlling the display of textual markup is performed by a processor executing instructions in tangible memory and may comprise tokenizing a pre-edit string and a post-edit string into a pre-edit token list and a post-edit token list, configuring a token comparator to compare the pre-edit token list and the post-edit token list to generate an annotated diff token list, analyzing the annotated diff token list with a diff token analyzer to determine the size of hidden-copy tokens adjacent to edit tokens in the annotated diff token list, applying the annotated diff token list and a copy threshold value range to an inflection analyzer to populate a list of inflection values in an inflection array to indicate copy threshold values which cause visible changes in the display of stylized text within an output string, and/or mapping the inflection array to an interface display control to calibrate the display of the stylized text within the output string on a machine user interface. The copy threshold value range may be a list of the lengths of all copy tokens in the annotated diff token list. The copy threshold values are determined by finding a Levenshtein Distance between the pre-edit string and the post-edit string. The inflection array may contain the copy threshold values denoting different possible lengths of character edits. The copy threshold values from multiple inflection arrays may be averaged to produce the inflection array to be mapped onto normalized scale values on the interface display control to configure the user interface to display textual markup. The hidden-copy tokens may be copy tokens adjacent to edit tokens in the annotated diff token list.

The system for the auto-generation of readable markup 300 comprises an inflection analyzer 108, an interface display control 126, an inflection array 132, a diff token analyzer 302, a hidden-copy tokens 304, an annotated diff token list 306, an output string 308, an output string 310, an output string 312, a post-edit string 324, a pre-edit string 326, a tokenizer 328, a comparator 330, and a copy threshold value range 332.

The inflection array 132 further comprises an inflection value 316, an inflection value 318, and an inflection value 320, The tokenizer 328 tokenizes the 326 and the post-edit string 324. The comparator 330 generates an annotated diff token list 306 from the post-edit token list 112 and the pre-edit token list 110 generated by the tokenizer 328. The annotated diff token list 306 contains the hidden-copy tokens 304 and the diff token analyzer 302 analyzes the length of the hidden-copy tokens 304 to generate the copy threshold value range 332. the copy threshold value range 332 and the annotated diff token list 306 are applied to the inflection analyzer 108 to generate the inflection array 132. the inflection value 316, the inflection value 320, and the inflection value 318 are mapped to the interface display control 126 to display the output string 312, the output string 310, or the output string 308 on the UI 104.

The system for the auto-generation of readable markup 300 may be operated in accordance with the process for the auto-generation of markup 200.

Figure 4:
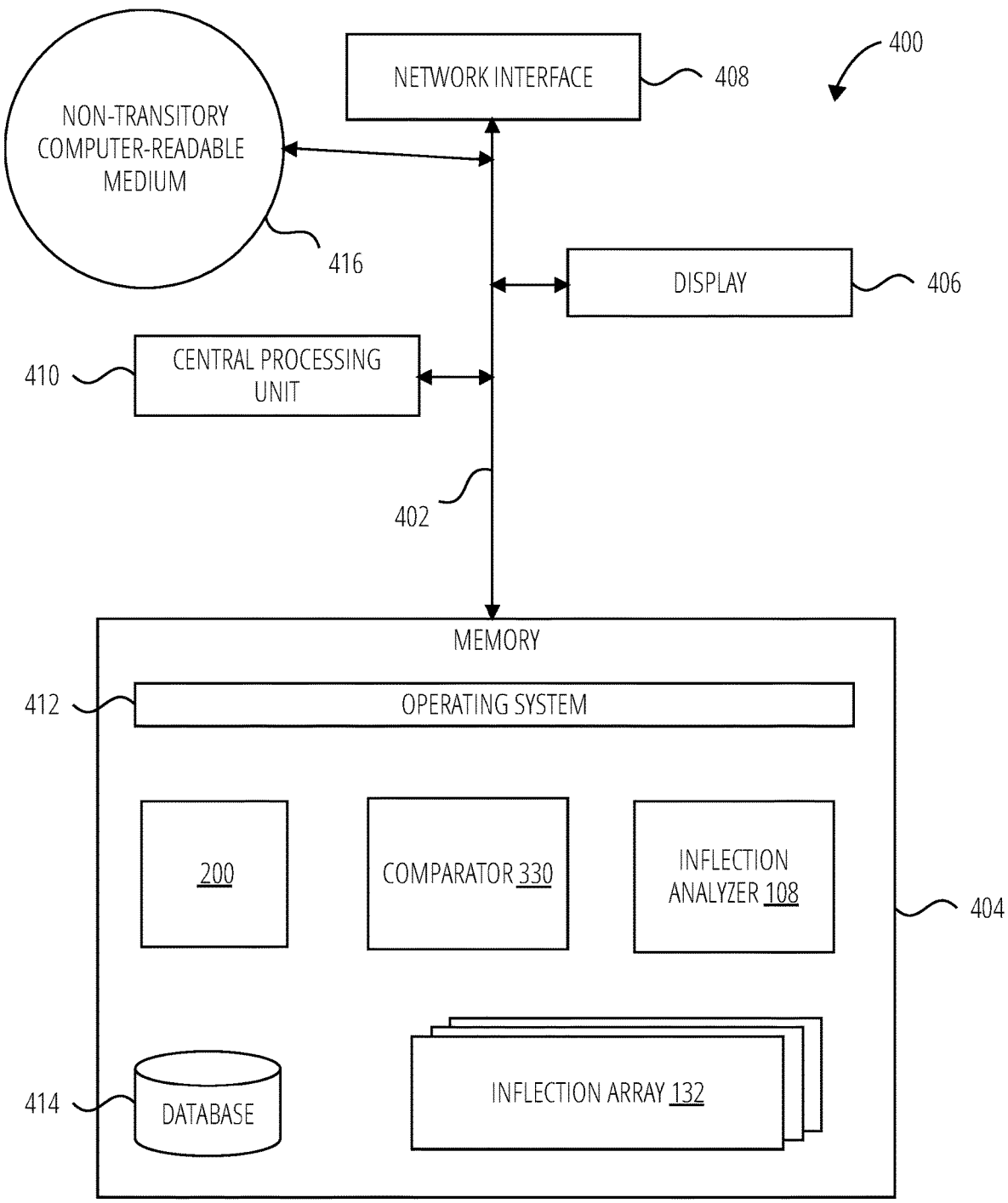
FIG. 4 illustrates a system 400 in accordance with one embodiment.

FIG. 4 illustrates several components of an exemplary system 400 in accordance with one embodiment. In various embodiments, system 400 may include a desktop PC, server, workstation, mobile phone, laptop, tablet, set-top box, appliance, or other computing device or apparatus that is capable of performing operations such as those described herein. In some embodiments, system 400 may include many more components than those shown in FIG. 4. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 400 may comprise one or more physical and/or logical devices that collectively provide the functionalities described herein. In some embodiments, system 400 may comprise one or more replicated and/or distributed physical or logical devices.

In some embodiments, system 400 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 400 includes a bus 402 interconnecting several components including a network interface 408, a display 406, a central processing unit 410, and a memory 404.

Memory 404 generally comprises a random access memory ("RAM") and permanent non-transitory mass storage device, such as a hard disk drive or solid-state drive. Memory 404 stores an operating system 412.

These and other software components may be loaded into memory 404 of system 400 using a drive mechanism (not shown) associated with a non-transitory computer-readable medium 416, such as a DVD/CD-ROM drive, memory card, network download, or the like.

Memory 404 also includes database 414. In some embodiments, system 400 may communicate with database 414 via network interface 408, a storage area network ("SAN"), a high-speed serial bus, and/or via the other suitable communication technology.

In some embodiments, database 414 may comprise one or more storage resources provisioned from a "cloud storage" provider, for example, Amazon Simple Storage service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A method comprising:
    generating an annotated diff token list by comparing a pre-edit token list and a post-edit token list for differences;
    generating a copy threshold value range based on sizes of hidden-copy tokens in the annotated diff token list;
    populating a list of inflection values in an inflection array based on the annotated diff token list and the copy threshold value range, the list of inflection values configured to indicate copy threshold values which cause visible changes in the display of text within an output string; and
    mapping the inflection array to an interface display control to calibrate a display of the text within the output string on a user interface.

2. The method of claim 1 wherein the copy threshold value range comprises a list of the lengths of copy tokens in the annotated diff token list.

3. The method of claim 1 wherein copy threshold values are determined by finding a Levenshtein Distance between the pre-edit string and the post-edit string.

4. The method of claim 1 wherein the inflection array contains the copy threshold values denoting different possible lengths of character edits.

5. The method of claim 1 wherein the copy threshold values from multiple inflection arrays are averaged to produce the inflection array to be mapped onto normalized scale values on the interface display control to configure the machine user interface to display textual markup.

6. The method of claim 1 wherein the hidden-copy tokens further comprise copy tokens adjacent to edit tokens in the annotated diff token list.

7. A computing apparatus comprising:
    a processor; and
    a memory storing instructions that, when executed by the processor, configure the apparatus to:
        tokenize a pre-edit string and a post-edit string into a pre-edit token list and a post-edit token list;
        configure a token comparator to compare the pre-edit token list and the post-edit token list to generate an annotated diff token list;
        analyze the annotated diff token list with a diff token analyzer to determine the size of hidden-copy tokens adjacent to edit tokens in the annotated diff token list;

apply the annotated diff token list and a copy threshold value range to an inflection analyzer to populate a list of inflection values in an inflection array to indicate copy threshold values which cause visible changes in the display of text within an output string; and map the inflection array to an interface display control to calibrate the display of the text within the output string on a machine user interface.

8. The computing apparatus of claim 7 wherein the copy threshold value range comprises a list of the lengths of copy tokens in the annotated diff token list.

9. The computing apparatus of claim 7 wherein the copy threshold values are determined by finding a Levenshtein Distance between the pre-edit string and the post-edit string.

10. The computing apparatus of claim 7 wherein the inflection array contains the copy threshold values denoting different possible lengths of character edits.

11. The computing apparatus of claim 7 wherein the copy threshold values from multiple inflection arrays are averaged to produce the inflection array to be mapped onto normalized scale values on the interface display control to configure the machine user interface to display textual markup.

\* \* \* \* \*